United States Patent [19]
Kato et al.

[11] Patent Number: 5,500,871
[45] Date of Patent: Mar. 19, 1996

[54] SPREAD SPECTRUM COMMUNICATION TRANSMITTER AN LSI THEREFOR

[75] Inventors: Shunji Kato; Hiromitsu Miyajima, both of Ageo, Japan

[73] Assignee: Mitsui Mining & Smelting Co., Ltd., Nihombashi-Muromachi, Japan

[21] Appl. No.: 225,252

[22] Filed: Apr. 8, 1994

[51] Int. Cl.[6] ................................... H04B 1/69
[52] U.S. Cl. ........................... 375/208; 375/200
[58] Field of Search ................ 375/1, 200, 202, 375/208–210; 364/721

[56] References Cited

U.S. PATENT DOCUMENTS

| | | | |
|---|---|---|---|
| 4,951,237 | 8/1990 | Essenwanger | 364/721 |
| 5,280,499 | 1/1994 | Suzuki | 375/1 |
| 5,323,418 | 6/1994 | Ayerst et al. | 375/1 |

FOREIGN PATENT DOCUMENTS

04302553  10/1992  Japan .

*Primary Examiner*—Salvatore Cangialosi
*Attorney, Agent, or Firm*—Bucknam and Archer

[57] ABSTRACT

High-sensitivity transmission can be performed in a wide temperature range, and spread spectrum communication free from jitters and bit errors in high-speed digital signal transmission can be performed. There is provided a spread spectrum communication transmitter for performing FSK modulation for switching the frequency in correspondence with the level of each bit of the serial digital data, performing spread spectrum modulation of a resultant FSK-modulated signal, and transmitting the data, wherein an FSK modulation unit (1) for performing the FSK modulation has a direct digital synthesizer and a synchronization circuit (19) is arranged to synchronize an FSK signal having a frequency corresponding to at least one level of the each bit with a PN code for the spread spectrum modulation.

6 Claims, 6 Drawing Sheets

SPREAD SPECTRUM COMMUNICATION TRANSMITTER AN LSI THEREFOR

FIELD OF THE INVENTION

The present invention relates to a spread spectrum communication transmitter for transmitting digital data and a large scale integrated circuit (LSI) used for this transmitter and, more particularly, to a relatively simply constituted spread spectrum communication transmitter capable of transmitting data at high speed and an LSI for realizing a compact transmitter of this type having low power consumption.

BACKGROUND OF THE INVENTION

A so-called spread spectrum communication (SSC) scheme is a scheme for diffusing the frequency spectrum of a transmission signal using a pseudo noise (PN) code. The SSC scheme only requires a low transmission power density per unit frequency bandwidth and is excellent in privacy, confidentiality, and resistance to interference. In spread spectrum communication, digital data to be transmitted is spread (spread modulation) to a wide frequency band using the PN (Pseudo Noise) code, and the modulated digital data is transmitted from the transmitter. The receiver generates a PN code (to be referred to as an SS reference signal hereinafter) having an image relationship with the PN code on the transmitter. The receiver correlates between the SS reference signal and the receiver input signal, then forms a correlation peak sequence. This correlation peak sequence is detected and waveshaped to demodulate the transmission data. A correlator for calculating the above correlation is a SAW (Surface Acoustic Wave) device such as a SAW convolver or a matched filter.

As this spread spectrum communication apparatus, a transmitter for performing frequency shift keying (FSK) modulation (primary modulation) using a VCO (Voltage-Controlled Oscillator) and then performing direct spread modulation (secondary modulation) using a PN code to transmit data is described in, e.g., Tsubouchi et al., "Asynchronous SSC Transceiver Using SAW Convolver", (Study Meeting of Spread Spectrum Communication of the Institute of Electronics and Communication Engineers of Japan, Apr. 1 and 2, 1988, SS88-7). This reference also describes a receiver comprising a front-end unit for reducing noise from a receiver input signal and amplifying the resultant signal, a correlator for calculating a correlation with a SS reference signal, a detector for detecting the envelope of an output from the correlator, and a waveshaper for waveshaping the detection output.

This SSC apparatus performs transmission by using a frequency obtained by frequency-conversion and frequency-multiplication, as a carrier (center) frequency, which means one component of the FSK signals, e.g., an FSK signal component corresponding to high ("H") level of digital data (base-band information) to be transmitted. On the other hand, the receiver has the SS reference signal to be correlated with the receiver input signal on the basis of an assumption that data to be transmitted is transmitted at this center frequency.

The VCO controls the frequency by mainly using a variable capacitive element (variable capacitor) constituting an inductance-capacitance (LC) oscillator. The frequency undesirably changes with a change in temperature and jitters may be generated in high-speed digital signal transmission because inductance (L) and capacitance (C) are used.

Figure 6:
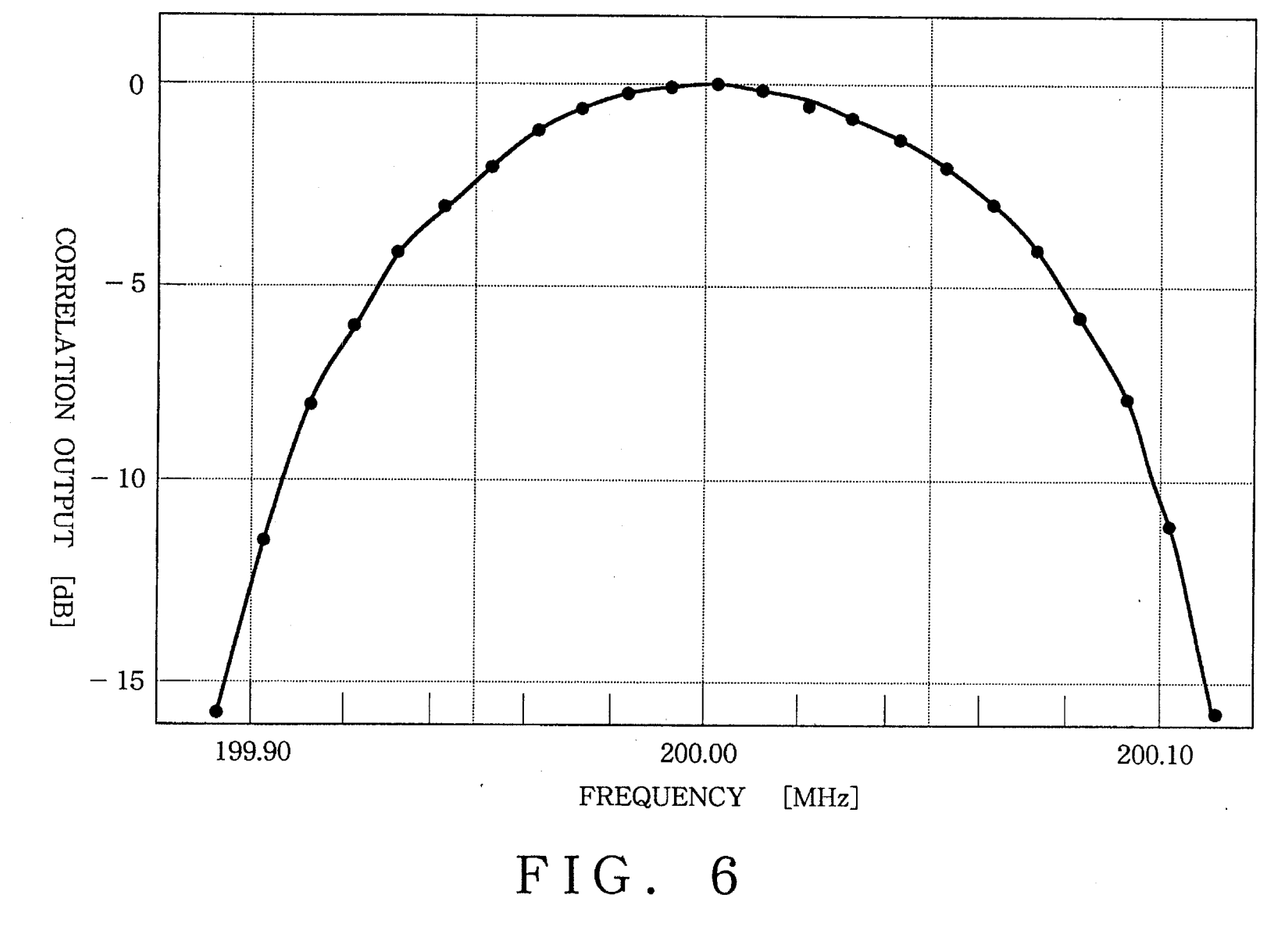
FIG. 6 is a graph showing a correlation output in an SSC receiver having a predetermined center frequency when the center frequency of a transmission signal is changed.

When the carrier frequency changes with a change in VCO oscillation frequency, the correlation output of the receiver decreases substantially. FIG. 6 shows a correlation output level obtained upon reception by a receiver which has an SS reference signal using a center frequency of 200 MHz while the carrier frequency is changed on the transmitter. It is apparent that the correlation output level drops by 10 to 12 dB with a slight change in carrier frequency by 0.05% (0.1 MHz).

The jitters problem generated during high-speed digital signal transmission can be solved by FSK modulation using a direct digital synthesizer (to be referred to as a DDS hereinafter), as proposed in Japanese Patent Laid-Open No. Hei 4-302553 filed by the assignee of the present application. A quartz oscillator can be used as a clock source to drive the DDS to solve the problem posed by the change in frequency.

As described above, using the quartz oscillator and the DDS in the FSK modulation unit, the problems of the change in frequency caused by the change in temperature and of the jitters during high-speed digital signal transmission can be solved. In this case, the frequent occurrence of bit errors during high-speed digital signal transmission is left as another unsolved problem.

SUMMARY OF THE INVENTION

The present invention has been made in consideration of the conventional problems described above, and has as its object to provide a transmitter capable of high-sensitivity communication within a wide temperature range and is adapted for performing spread spectrum communication free from jitters and bit errors during high-speed digital signal transmission, and an LSI suitable for constituting this transmitter.

In order to achieve the above object, a spread spectrum communication transmitter according to the present invention performs FSK modulation for switching the carrier frequency of serial digital data in correspondence with the binary level of each bit, and performs spread spectrum modulation of the FSK-modulated serial digital data signal, and transmits the resultant signal. Moreover, an FSK modulation unit for performing the FSK modulation comprises a DDS, and a frequency corresponding to at least one level of the serial digital data is synchronized with a PN code for spread spectrum modulation.

A preferred embodiment of the present invention comprises a synchronization unit for synchronizing the first clock for the DDS with the second clock for the PN code. The FSK modulation unit reads out the amplitude value of a sine or cosine wave having a phase of every integer fraction of $2\pi$ from a sine or cosine wave memory constituting the DDS in response to the first clock, thereby forming a sine or cosine wave signal having a frequency corresponding to one level. A frequency $f_{FS}$ of the first clock is defined as $2^m \cdot f_{PN}/(2^n-1)$ where m and n are integers, $f_{PN}$ is the frequency of the second clock, and $2^n-1$ is the chip length of the PN code. The FSK modulation unit comprises a quartz oscillator for performing self-excited oscillation at almost $2^m \cdot f_{PN}/(2^n-1)$ and a synchronization circuit for synchronizing an output frequency of the quartz oscillator with the second clock.

An LSI according to the present invention is used in a spread spectrum communication transmitter for FSK-modulating digital data, performing spread spectrum modulation of the FSK-modulated signal, and transmitting the resultant signal. The LSI incorporates a DDS for forming the FSK-modulates signal in response to the first clock, a PN code generator for generating a PN code for spread spectrum modulation in response to the second clock, and a synchronization circuit for synchronizing the first clock with the second clock.

A DDS is excellent in phase stability and frequency stability when a quartz oscillator is used as a fundamental frequency oscillator. In addition, the DDS has a high switching speed of output frequency. According to the present invention, the FSK modulation unit is arranged using the DDS, and transmission with little phase jitters can be performed for high-speed data having a high transmission rate. In addition, a DDS drive clock is synchronized with a PN code generation clock using the quartz oscillator to improve temperature stability, to prevent a decrease in transmission/reception sensitivity, and greatly reduce bit errors.

A commercially available DDS can be used as the DDS of this embodiment. In this case, an external processor is required. To synchronize a DDS output with a PN code, a counter, a phase detector, and the like are required as peripheral circuits. As a result, the circuit scale and power consumption increase on the transmitting side, which poses a serious problem for a battery-driven, portable transmitter.

By incorporating the DDS, the PN code generator, and at least some of the peripheral circuits for synchronization on a single LSI to omit the processor and program required in a conventional DDS LSI, a compact, lightweight, low-power-consumption transmitter can be obtained and, in addition, operations and settings thereof can be simplified, and reliability thereof can be improved.

DETAILED DESCRIPTION OF THE PREFERRED EMBODIMENT

A preferred embodiment of the present invention will be described with reference to the accompanying drawings.

Figure 1:
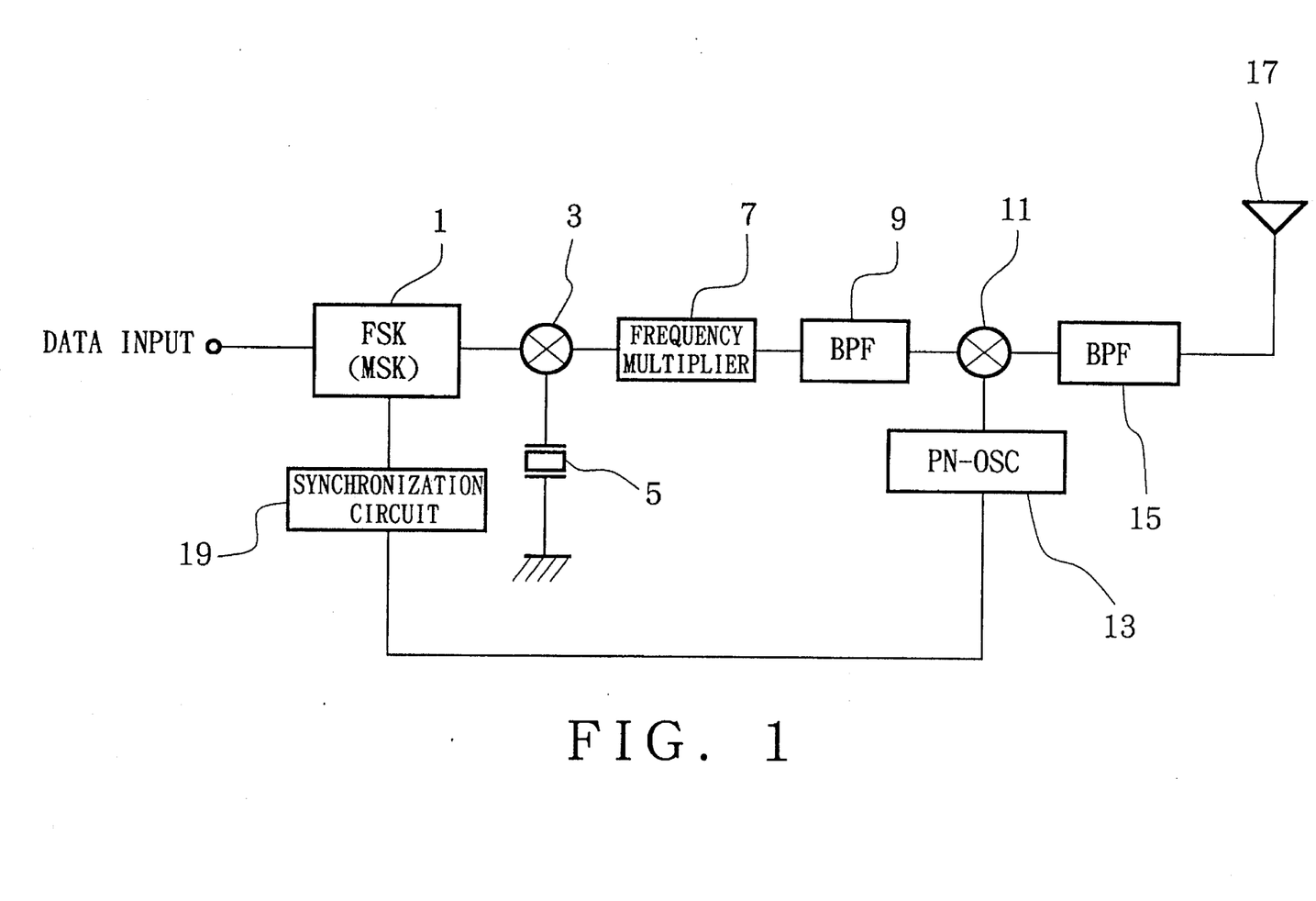
FIG. 1 is a block diagram of an SSC transmitter according to an embodiment of the present invention.

FIG. 1 is a block diagram of an SSC transmitter according to an embodiment of the present invention. This SSC transmitter comprises an FSK (Frequency Shift Keying) modulator 1, a mixer (double-balanced modulator) 3, a local oscillator 5, a frequency multiplier 7, a band-pass filter (BPF) 9, a mixer 11, a PN code generator 13, a BPF 15, a transmission antenna 17, and a synchronization circuit 19.

The operation of the SSC transmitter having the above arrangement will be described below.

Referring to FIG. 1, the FSK (including minimum shift keying (MSK)) modulator 1 comprises a DDS and performs primary modulation of externally inputted serial digital data. More specifically, the FSK modulator 1 generates signals having different frequencies (to be referred to as $f_1$ and $f_2$ hereinafter) in accordance with the levels of the binary signal of each bit of the input data. In the following description, it is assumed that $f_1$=13 MHz and $f_2$=13.5 MHz. The input data is PCM data, data output from a computer system or any other digital equipment, or the like. The input data is inputted in synchronism with a PN code generated by the PN code generator 13, as indicated in Japanese Patent Laid-Open No. Hei 4-176226. The data transmission rate of the input data is, e.g., about 524 kbps. The transmission rate of a modem generally used in conventional data transmission falls within the range of about 1,200 to 9,600 bps.

The 13-MHz band signal output from the FSK modulator 1 is mixed with a 37-MHz band oscillation signal from the local oscillator 5 by the mixer 3 and converted into a 50-MHz band frequency signal. The frequency of this signal is multiplied four times by the frequency multiplier 7, thereby obtaining a 200-MHz band FSK high-frequency signal. The BPF 9 removes a noise component such as a spurious component from an output signal of the frequency multiplier 7, thereby extracting only the FSK high-frequency signal. The extracted FSK high-frequency signal is inputted to one input terminal of the mixer 11. A predetermined PN code signal is inputted from the PN code generator 13 to the other input terminal of the mixer 11. The FSK high-frequency signal is subjected to spread spectrum (SS) modulation (secondary modulation). The BPF 15 removes an unnecessary side-lobe component from the SS-modulated signal. The resultant signal is transmitted from the transmission antenna 17.

Figure 2:
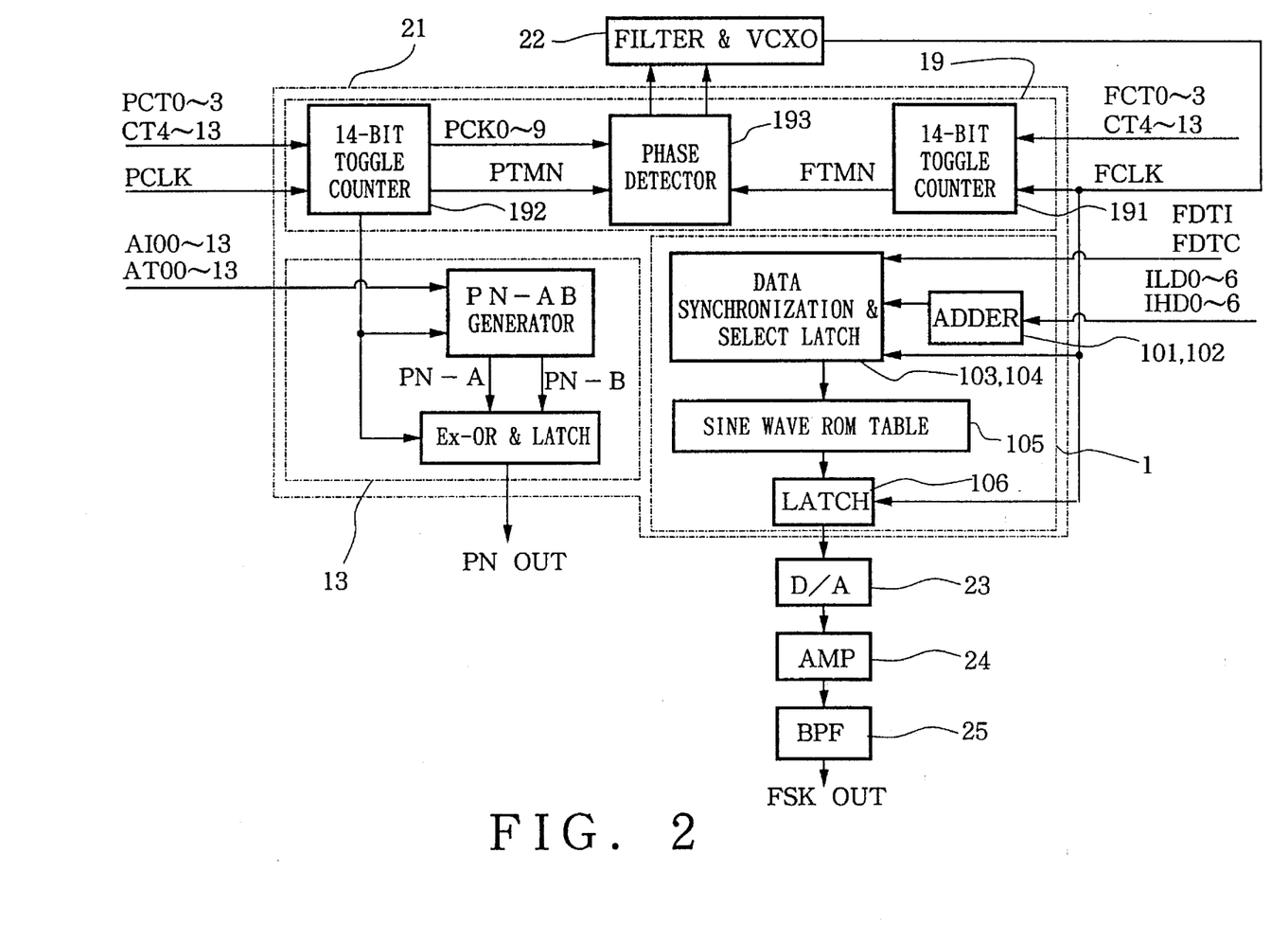
FIG. 2 is a block diagram of an LSI used in the SSC transmitter shown in FIG. 1.
Figure 3:
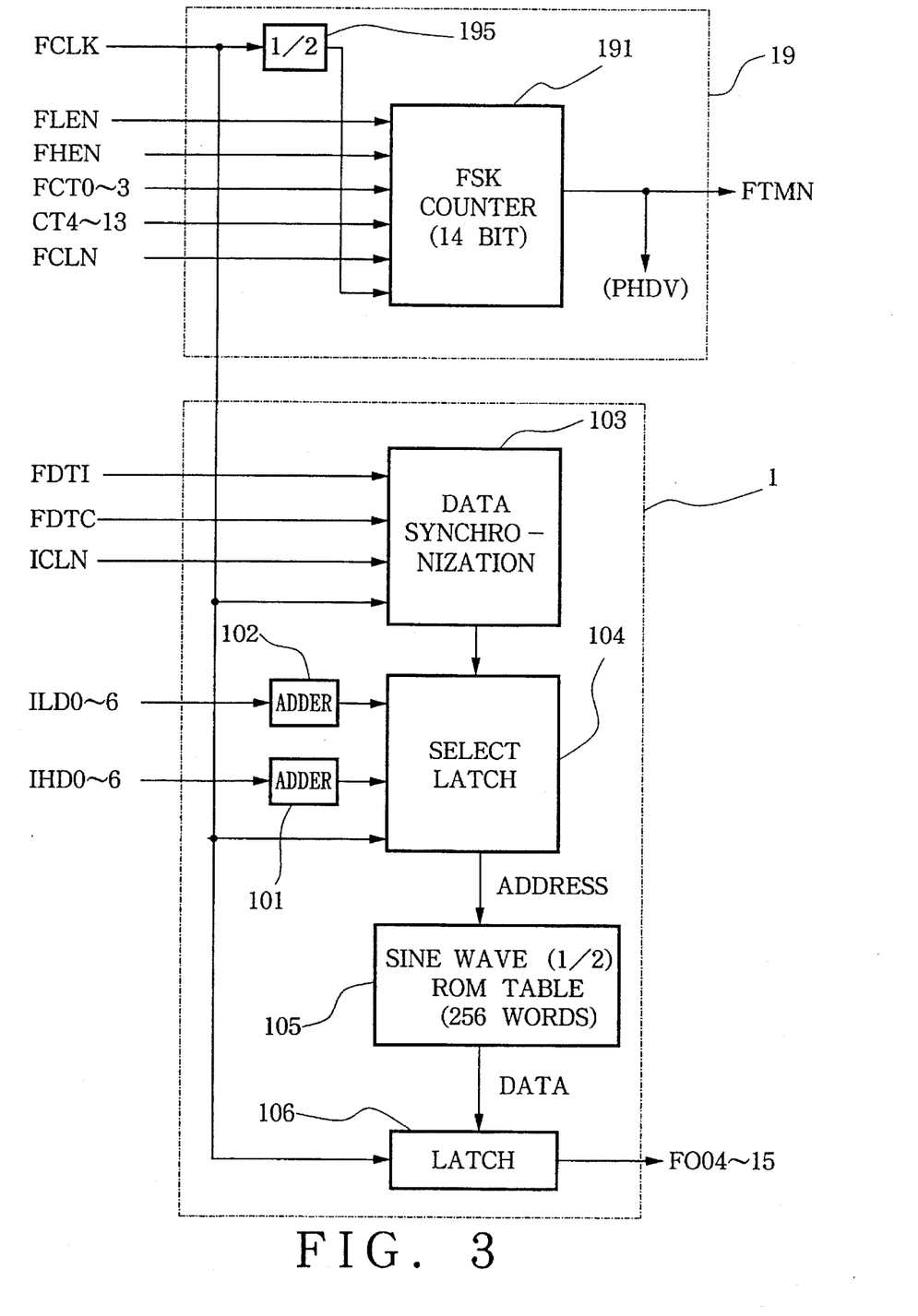
FIG. 3 is a detailed block diagram of an FSK modulator section of FIG. 2.
Figure 4:
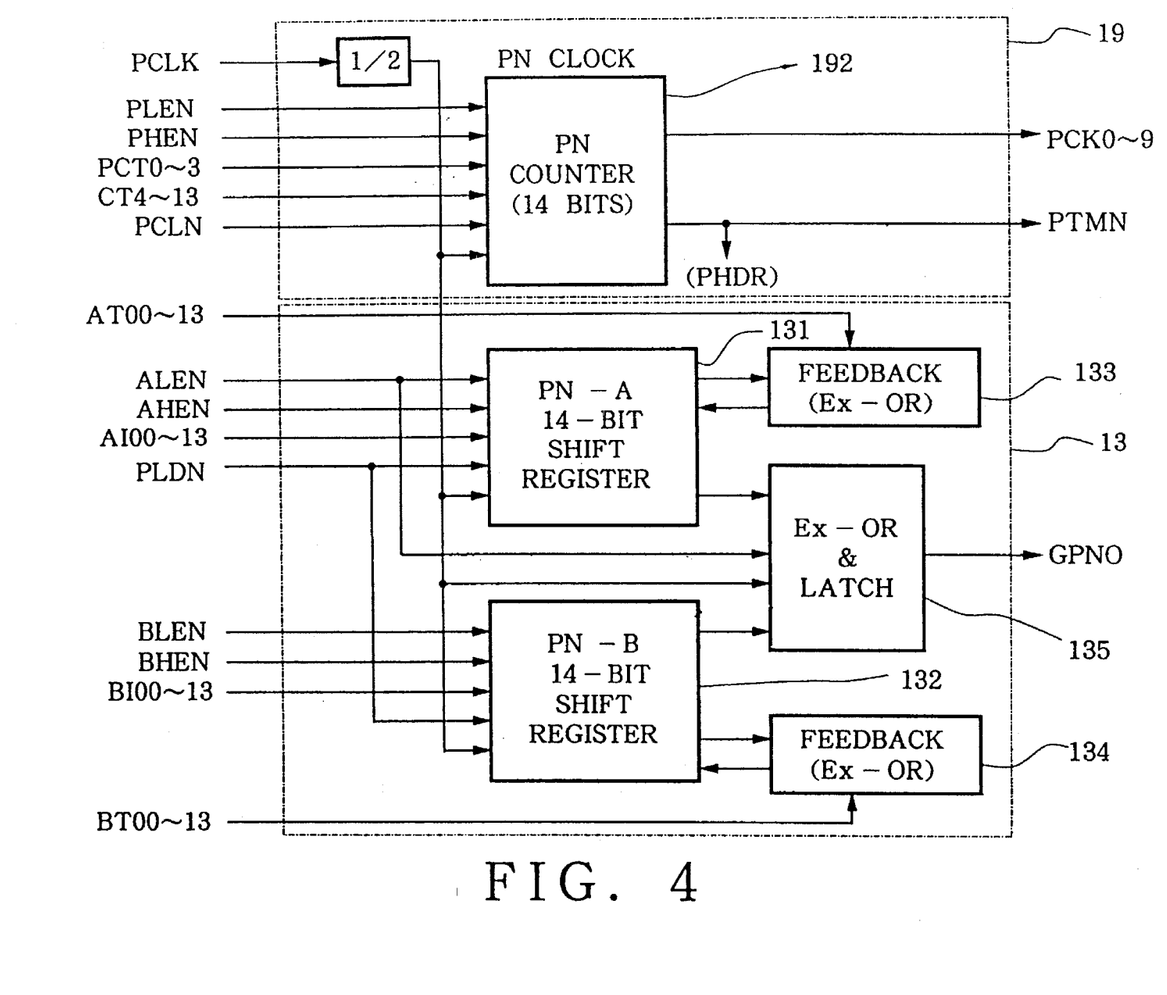
FIG. 4 is a detailed block diagram of a PN code generator section of FIG. 2.

FIG. 2 shows the arrangement of a one-chip C-MOS LSI in which the main parts of the FSK modulator 1, the PN code generator 13, and the synchronization circuit 19 shown in FIG. 1 are integrated. This LSI 21 is arranged such that a filter, an FSK clock generator 22, a D/A converter 23, and the like are externally attached thereto. A quartz oscillator (VCX0) is preferably used as the FSK clock generator. FIGS. 3 and 4 show detailed arrangements of the FSK modulator 1 (including part of the synchronization circuit 19) and the PN code generator 13 (including part of the synchronization circuit 19) in the LSI 21 shown in FIG. 2. An LSI sample prepared had outer dimensions of 25×25×3 mm and a consumption power of 520 mW for a 50-MHz (clock) input. Using this LSI, a compact, lightweight, low-power-consumption, high-reliability SSC transmitter can be manufactured. The number of terminal pins of this LSI is 160. Various settings of the FSK modulator 1 and the PN code generator can be performed by opening (OPEN) or grounding (connection to GND) the respective terminals of these circuits.

Referring to FIG. 3, the FSK modulator (DDS) 1 comprises adders 101 and 102, a data synchronization circuit 103, a select latch 104, a sine wave ROM table 105, and a latch 106. The sine wave ROM table 105 stores 12-bit data representing the amplitude value of the sine wave at each of the 256 phases ranging from phase 0 to phase $\pi$. In the circuit shown in FIG. 3, a phase increment register H (i.e., terminals IHD0 to IHD6) and a phase increment register L (i.e., terminals ILD0 to ILD6) store 7-bit values (0 to 127), respectively. The adders 101 and 102 respectively accumulate the values (in fact, values obtained by converting the values of the registers H and L in accordance with a predetermined rule) set in the phase increment registers H and L within each clock period of a clock FCLK output from the FSK clock generator 22. The select latch 104 latches a valid value (lower 9-bit data of the integer part, i.e., a sign (positive or negative sign) bit and an 8-bit value (0 to 255) corresponding to an address) corresponding to whether the level of each of the binary data FDT1 inputted through the synchronization circuit 103 from the cumulative values of the adders 101 and 102 is high ("H") or low ("L") in response to the clock FCLK. The select latch 104 then outputs the latched value as an address to the sine wave ROM table 105. The latch 106 latches an output from the designated address of the sine wave ROM table 105 every clock FCLK and outputs a 12-bit digitized sine wave. This digitized sine wave is converted into an analog waveform by the D/A converter 23 and a BPF 25, both of which are externally mounted circuits shown in FIG. 2. The converted signal is output as an FSK-modulated signal (FSK OUT). Reference numeral 24 denotes an amplifier. A frequency $f_{FS}$ of the FSK-modulated signal is defined as $f_{FS}=f_{DD}\cdot\theta_f/512$ where $f_{DD}$ is the frequency of the clock FCLK and $\theta_f$ is the value of the phase increment register.

Referring to FIG. 4, the PN code generator 13 comprises shift registers 131 and 132, exclusive OR circuits (ExOR) 133 and 134 as feedback circuits, an exclusive OR circuit for synthesizing outputs from the shift resisters 131 and 132, and an latch circuit 135 for latching the resultant signal. This PN code generator 13 comprises a 14-stage (14-bit) shift register and can generate a PN code having a chip length of 16,383 ($=2^{14}-1$). This LSI incorporates two PN code generators (i.e., the shift registers 131 and 132 and the feedback circuits 133 and 134), and can generate a Gold-sequence signal in addition to M-sequence signals. Settings of PN codes to be generated can be set by opening or grounding feedback tap setting terminals AT00 to AT13 and BT00 to BT13, and initial value setting terminals AI00 to AI13 and BI00 to BI13.

Referring to FIGS. 2 to 4, the synchronization circuit 19 comprises 14-bit counters 191 and 192 and a phase detector 193. The phase detector 193 detects a phase difference between a ripple carry FTMN of the FSK counter 191 and a ripple carry PTMN of the PN counter 192. This phase difference output is supplied to the filter and the quartz oscillator 22, both of which are externally attached to the chip. The FSK clock FCLK can be synchronized with the PN clock PCLK at a period of the ripple carry. The respective counter data (PCT0 to PCT3, FCT0 to FCT3, and CT4 to CT13) are set to allow communication in which the FSK-modulated signal is synchronized with the PN code.

Referring to FIGS. 3 and 4, reference symbols FLEN, FHEN, PLEN, PHEN, ALEN, AHEN, BLEN, and BHEN denote clock enable terminals; FCLN and PCLN, counter load enable terminals; FDTC, a data clock input terminal; PLDN, an initial value load terminal; ICLN, an initial clear terminal; PCK0 to PCK9, counter output terminals; and GPN0, a PN code output terminal.

Figure 5:
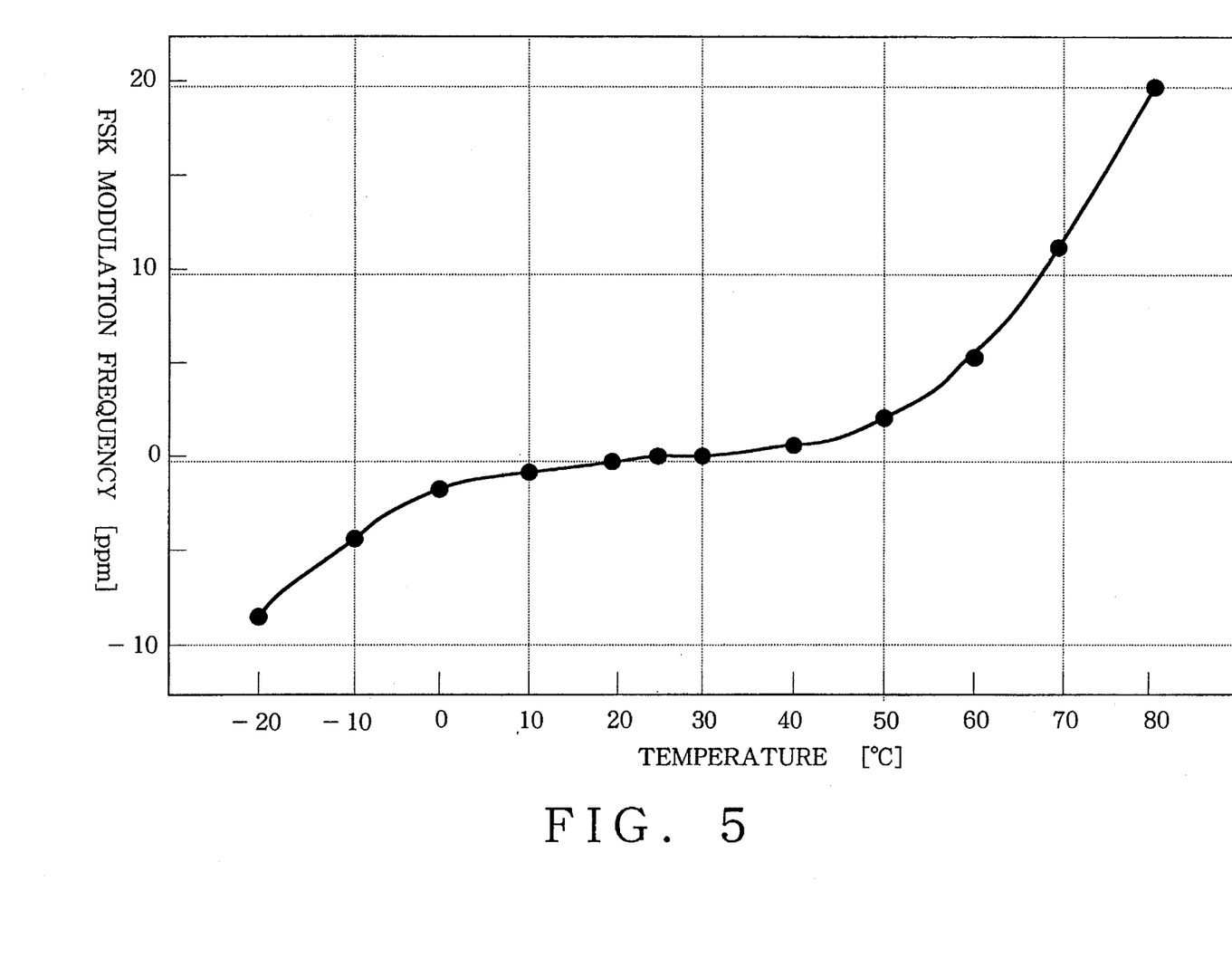
FIG. 5 is a graph showing the temperature characteristics of the FSK modulation frequency in the SSC transmitter shown in FIG. 1.

The SSC transmitter in FIG. 1 is manufactured using the LSI shown in FIG. 2. The temperature characteristics of the frequency of the FSK-modulated signal for H level data are shown in FIG. 5. A change in frequency of the FSK-modulated signal could be suppressed within almost ±10 ppm (0.001%) with respect to the temperature range of −20° C. to 70° C. That is, the change in carrier frequency fell within ±2 kHz, and the decrease in correlation output was almost zero. This transmitter had numerical values of the respective sections as follows. The clock frequency $f_{PN}$ of the PN code was set to $f_{PN}$=66 MHz. The chip length was set to 63 (126 PN clocks). The fundamental oscillation frequency $f_{FS}$ of the quartz oscillator for generating the FSK clock was $F_{fs}$=67.04762 MHz. The set value $\theta_{fH}$ of the phase increment register H was $\theta_{fH}$=100. The set value of the phase increment register L was $\theta_{fL}$=102. The frequency of the local oscillator was set to 36.90477 MHz. The center frequency was set to 200 MHz. The data transmission rate was set to 524 kbps. One-bit high ("H") level data was transmitted together with a one-period PN code and a 25-period FSK-modulated signal synchronized with the PN code. The frequency of the FSK-modulated signal with respect to the set value $\theta_{fH}$=100 of the phase increment register H is 13.09523 MHz, and the frequency of the FSK-modulated signal with respect to the set value $\theta_{fL}$=102 of the phase increment register L is 13.35713 MHz.

What is claimed is:

1. A spread spectrum communication transmitter comprising:

FSK modulation means for performing FSK modulation for switching frequency in correspondence with whether a binary level of each bit of the serial digital data to be transmitted is high or low, and SS modulation means for performing spread spectrum modulation of a resultant FSK-modulated signal and transmitting resultant data, wherein said FSK modulation means comprises a direct digital synthesizer and synchronizes an FSK modulation signal having a frequency corresponding to at least one binary level of said each bit with a PN code for the spread spectrum modulation, said PN code having a period which does not vary based upon a ratio of a number of said high level bits of said serial data to a number of said low level bits of said serial data.

2. A transmitter according to claim 1 further comprising a synchronization means for synchronizing a first clock for said direct digital synthesizer with a second clock for generating the PN code, wherein said FSK modulation means reads out, in a phase of every integer fraction of 2 in response to the first clock, an amplitude value of a sine or cosine wave stored in a sine or cosine wave memory constituting said direct digital synthesizer, said integer being switched in its number in accordance with whether a binary level of each bit of said serial digital data is high or low,-thereby forming sine or cosine wave FSK signals each having a frequency corresponding to said binary level.

3. An integrated circuit used in a spread spectrum communication transmitter for performing an FSK modulation of digital data, performing spread spectrum modulation of an FSK-modulated signal, and transmitting resultant data, comprising a direct digital synthesizer for forming the FSK-modulated signal in response to a first clock, a PN code generator for generating a PN code for the spread spectrum modulation in response to a second clock, said PN code having a sequence that is independent of serial digital data that is to be transmitted, and a synchronization circuit for synchronizing the first clock with the second clock.

4. A spread spectrum communication transmitter comprising:

PN generating means for generating a PN code sequence:

FSK modulation means for subjecting serial digital data to be transmitted to a frequency shift keying modulation and outputting a resultant FSK-modulated signal; and SS modulation means for subjecting said FSK-modulated signal to a spectrum spread modulation using said PN code, said PN code having a sequence that is independent of said serial digital data that is to be transmitted, wherein said FSK modulation means comprises a direct digital synthesizer and at least one of FSK modulation signals for said frequency shift keying modulation is synchronized with said PN code.

5. A transmitter according to claim 4 additionally comprising a synchronization means for synchronizing a first clock for said direct digital synthesizer with a second clock for generating the PN code, wherein said FSK modulation means reads out, in a phase of every integer fraction of $2\pi$ in response to the first clock, an amplitude value of a sine or cosine wave stored in a sine or cosine wave memory constituting said direct digital synthesizer, said integer being switched in its number in accordance with whether a binary level of each bit of said serial digital data is high or low, thereby forming sine or cosine wave FSK modulation signals each having a frequency corresponding to said binary level.

6. A transmitter according to claim 5, wherein said synchronization means synchronizes a predetermined number of the first clock with one period of said PN code.

* * * * *